(12) United States Patent
Smedlund

(10) Patent No.: US 6,276,507 B1
(45) Date of Patent: Aug. 21, 2001

(54) DEVICE AT REFUSE CHUTE

(75) Inventor: Lars Smedlund, Västra Frölunda (SE)

(73) Assignee: Smedlund Miljosuste, AB, Gothenburg (SE)

( * ) Notice: Subject to any disclaimer, the term of this patent is extended or adjusted under 35 U.S.C. 154(b) by 0 days.

(21) Appl. No.: 09/585,748

(22) Filed: Jun. 2, 2000

Related U.S. Application Data

(63) Continuation of application No. PCT/SE98/02216, filed on Dec. 3, 1998.

(30) Foreign Application Priority Data

Dec. 4, 1997 (SE) .................................................... 9704506

(51) Int. Cl.$^7$ ................................................ B65G 11/00
(52) U.S. Cl. ........................... 193/23; 193/31 A; 193/21
(58) Field of Search ................................. 193/14, 21, 23, 193/29, 31 A, 2 R

(56) References Cited

U.S. PATENT DOCUMENTS 1,287,711 * 12/1918 Lichtenberg ........................ 193/21 X
4,697,686 * 10/1987 West ....................................... 193/23
5,228,577 * 7/1993 Wilson ............................ 193/31 A X

FOREIGN PATENT DOCUMENTS 88065   2/1991 (FI) .
7317451 6/1975 (SE) .

* cited by examiner

Primary Examiner—James R. Bidwell
(74) Attorney, Agent, or Firm—Samuels, Gauthier & Stevens, LLP

(57) ABSTRACT

Device at refuse chute comprising one shaft (1), provided with one or more inlet openings (2), which ends in a refuse chamber (4) or the like, and at least two subchannels (3a, 3b) arranged in the shaft for transfer of the waste, which are arranged to open into said refuse chamber. The subchannels (3a, 3b) are formed partly by at least one shaft separator (7) of a pliable material, which is formed to extend along an essential part of the shaft, and partly from pants of the shaft walls (14). The shaft separator (7) is arranged to divide the shaft longitudinally essentially diametrically and its one longitudinal side edge (8b) is aligned with the inlet opening (s) (2). The side edge (8b) is laterally, displaceably arranged by one channel selector (6) arranged in or close to the inlet opening (2).

10 Claims, 8 Drawing Sheets

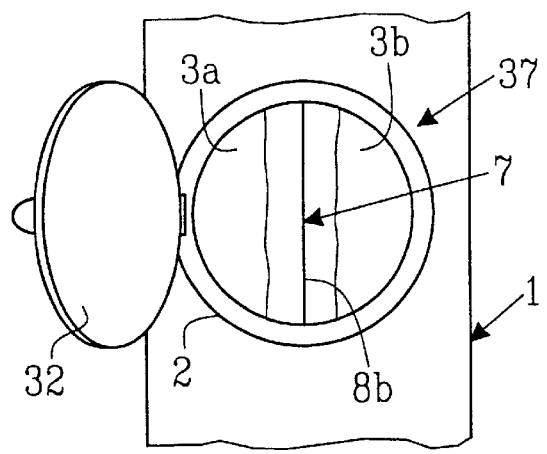
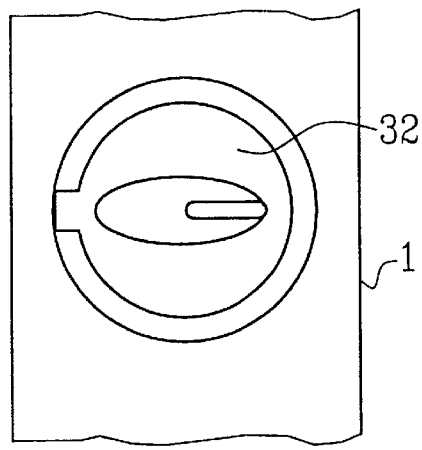
FIG.5      FIG.6
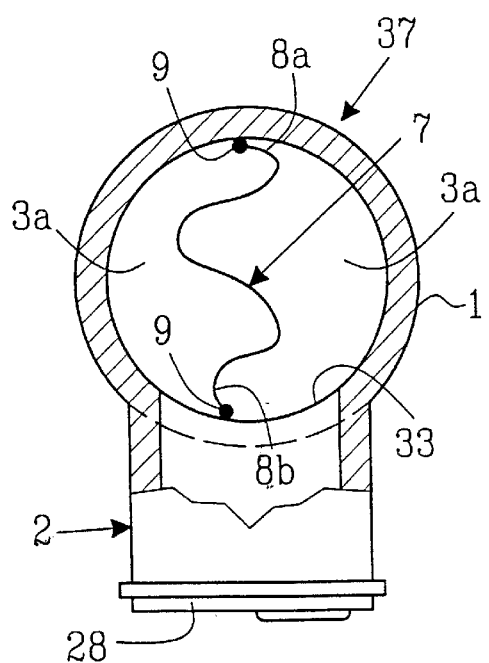
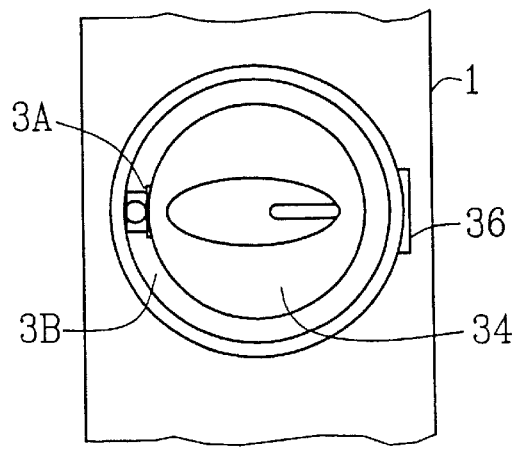
FIG.7      FIG.8

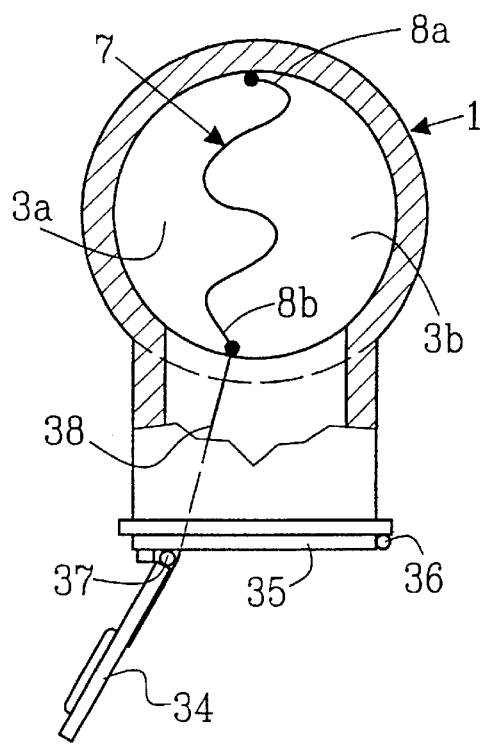
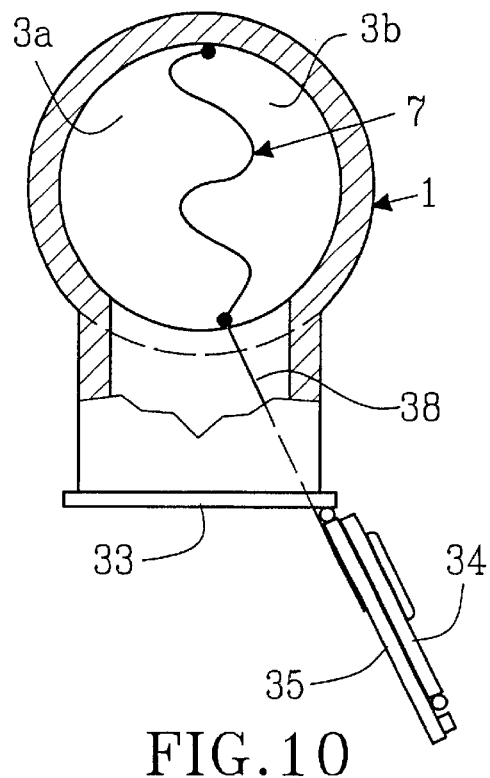
FIG.9  FIG.10
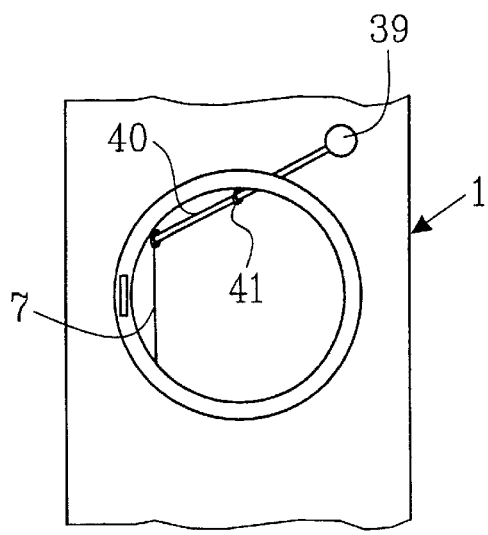
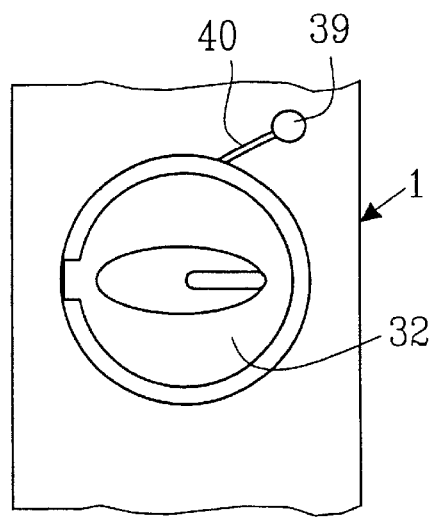
FIG.11  FIG.12

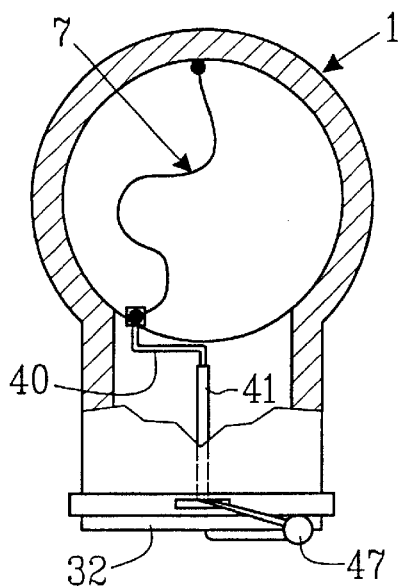
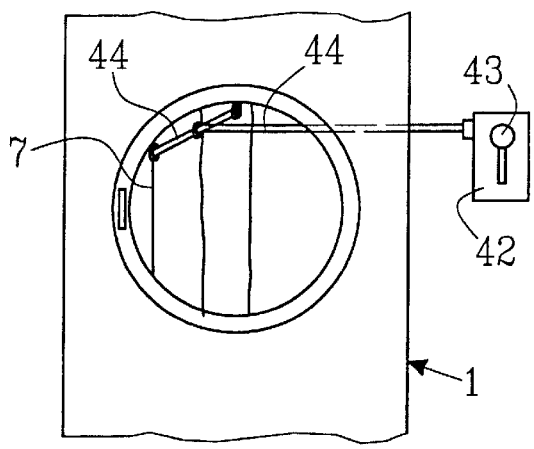
FIG.14
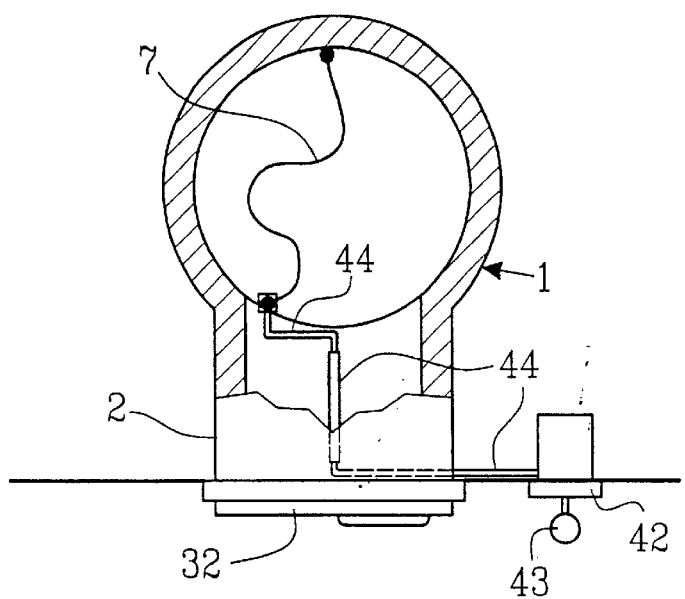
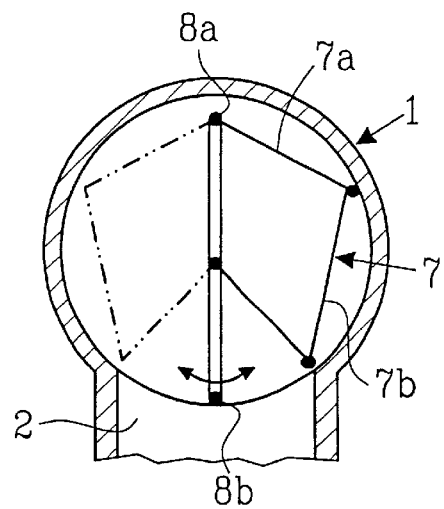
FIG.13
FIG.16
FIG.15

DEVICE AT REFUSE CHUTE

This application is a continuation of PCT/SE98/0221 Dec. 3, 1998.

FIELD OF THE INVENTION

The present invention relates to a device at refuse chute comprising one shaft, provided with one or more inlet openings, which ends in a refuse chamber or the like, and at least two subchannels arranged in the shaft for transfer of the refuse, which are arranged to run into said refuse chamber.

The background of the invention and the problem

Source sorting household wastes is now being introduced in an increasing number of municipalities. The households should thereby sort their own household wastes in different groups of material, so called fractions, consisting of essentially compostable kitchen waste and residual waste. This requires an increased effort on the households, an effort that some people experience demanding.

Each fraction to be sorted are to be put in its special location and in its special container. This can be a problem, especially for those living in block of flats with refuse chute, since the present refuse chute can not be used for sorting. In many places the refuse chutes have been shut and instead have for instance recycling houses been built in the yards. The service provided by the refuse chutes is hereby taken away and the tenant would have to walk long distances in order to get rid of the sorted waste. This will lead to a negative effect on the quality of living as well as the quality of the sorting by source.

By FI-B-88065 a device is known for separation of waste in a vertical transfer channel, which in its lower part also is connected to a collecting device, where the separated waste falls into predetermined containers. The transfer channel, which consists of an outertube of a pliable, e.g. cloth-like material, is intended to be hung in a compartment, for instance a shaft, which is large enough to host the waste container, with all its separate compartments for different kinds of waste. The outer transfer channel—the tube—is divided into a number subchannels, corresponding to the number of separation compartments. The subchannels can be in the form of tubing. e.g.. of fabric armed plastic film, which are designed so that their circumference can be brought to fill a large part of the cross section surface of the tube. Instead of having many separate tubings, the subchannels can consist of partition walls sewed together along the inside of the tube, which forms the subchannels together with parts of the inside of the tube. To be able to use the main part of the cross section of the tube and to obtain an opening large enough to feed the waste into a subchannel the outer walls of the tube has been given the shape of a concertina. As an alternative to this, bendable partition walls has also been suggested, which are wide enough to be put up towards the inside of the tube and in that case take up a substantial part of the total cross section area of the tube.

The problem with this known device is, that it can not be applied on existing refuse chutes, particularly if these have a circular cross section, which is almost the only existing cross section shape, since the maximum available input opening to each subchannel is limited by the other displaced subchannels. Consequently, in the embodiment according to FIG. 3 in the Finnish Patent, the passive subchannels on each side of an active subchannel will take up about 180° of the inner cross section of the tube, whereby no room is left for an input opening. In the embodiment according to FIG. 5 the input opening can at most correspond to the distance between two longitudinal seams, i.e., in the case of five subchannels, a fifth of the available width of the rectangular tube is desired. Already half the input opening is unacceptable. Additionally, the openings must be laterally displaced and be arranged in alignment with each subchannel respectively. In FIG. 4 the concertina variant is shown, in a passive condition retracted along its whole length, wherein there is a big risk that the waste instead of opening the subchannel, will get stuck in it.

It is desirable to maintain the high service level given by the refuse chutes and still be able to source sort the waste. However, there is today sorting devices for sorting of waste below the refuse chute, but these are very expensive to install and maintain.

The object of the invention and the solution of the problem

The object with the present invention is:

to provide a simple and cheap device, by means of which a separation of the waste can be performed at the input opening of the refuse chute, i.e. waste from a common starting point can be transported separately and in the lower outlet of the chute is collected in separate containers/collecting places.

that the inlet opening should essentially be as big as the cross section of the chute;

to be able to "re-use" present refuse chutes for source sorting of waste;

to be able to use present refuse chambers for mounting of containers for different kinds of waste;

to easily be able to adjust between different sorting alternatives at the inlet opening;

to provide a sanitary device, which is easy to clean, e.g., by flushing with water and which lacks dirt-collecting cavities;

that simultaneous throwing of refuse sacks from different floors not limits the transport to the selected container;

to provide a constructive simple device which is easy to assemble and dismantle and which requires practically no maintenance.

These objects have been solved by the characterising parts of the claims.

DESCRIPTION OF THE DRAWINGS

The invention will hereinafter be described in greater detail by a number of embodiments with reference to the enclosed drawings, however, without being limited to those.

FIG. 5 shows a front view of a part of a refuse chute with the door opened and a channel selector according to a second embodiment.

FIG. 6 shows a front view as in FIG. 5 but with the door closed.

FIG. 7 shows a section through the refuse chute according to FIG. 5.

FIG. 8 shows a front view of a part of a refuse chute with the door closed and a channel selector according to a third embodiment.

FIGS. 9–10 show sections through the refuse chute according to FIG. 8, with the channel selector in different end positions.

FIGS. 11–13 show a further variant of the channel selector according to the invention.

FIGS. 14–16 show the channel selector according to FIGS. 11–13, but arranged for operation by means of an electric motor.

DESCRIPTION OF THE EMBODIMENTS

Figure 1A:
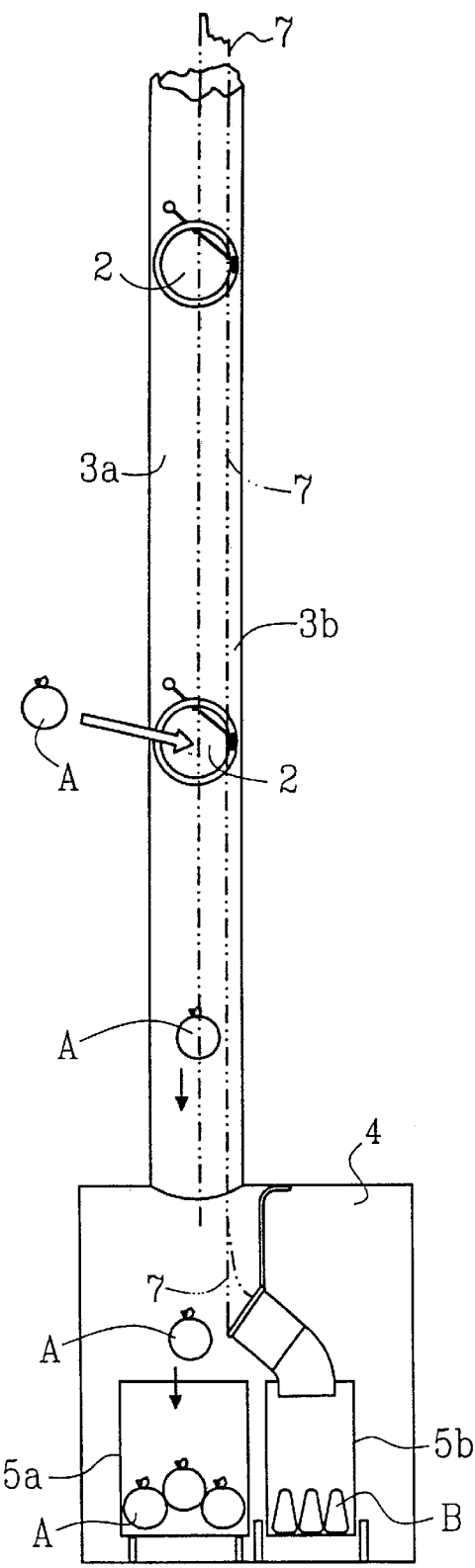
FIG. 1a shows schematically a vertical section through a part of a refuse chute with a connected/associated refuse chamber and the, chute separator according to the invention for transport to a residual refuse container.
Figure 1B:
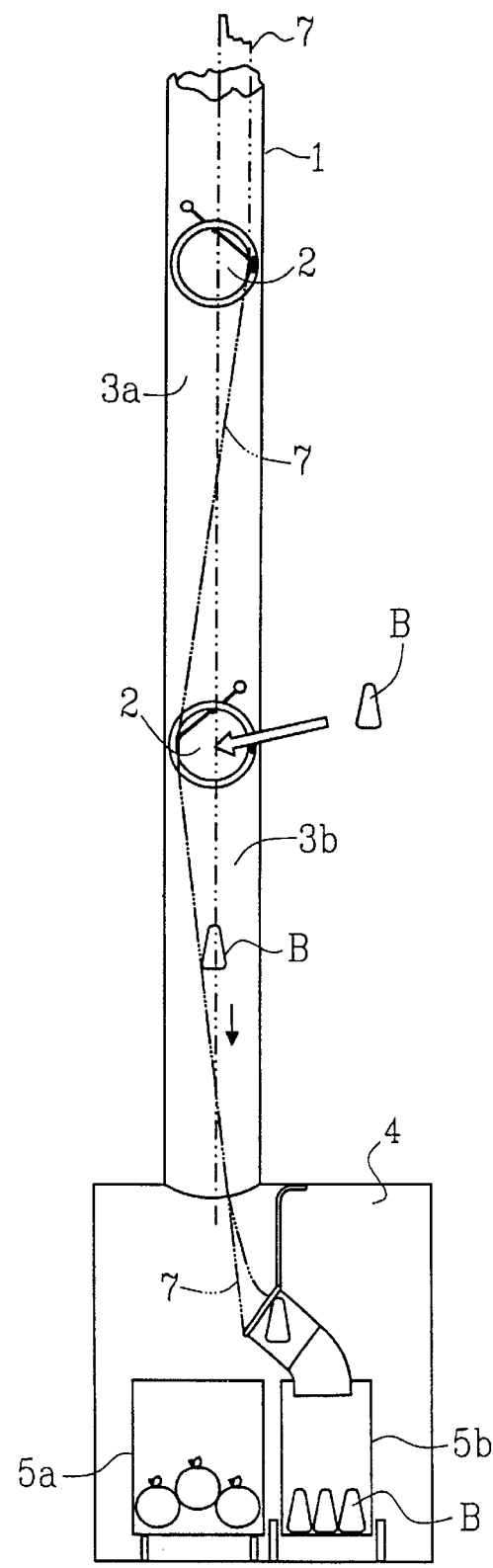
FIG. 1b shows a section analogous to FIG. 1, but with the chute separator according to the invention for transport to a container for compostable waste.

In FIGS. 1a and 1b a refuse chute is shown schematically, which extend through the different floors of a building and at every floor a refuse chute opening 2 is arranged. The refuse chute 1 in its lower part opens into a refuse chamber 4, which in the shown example is provided with two containers 5a and 5b for different kinds of waste.

Chuze separator

Figure 2A:
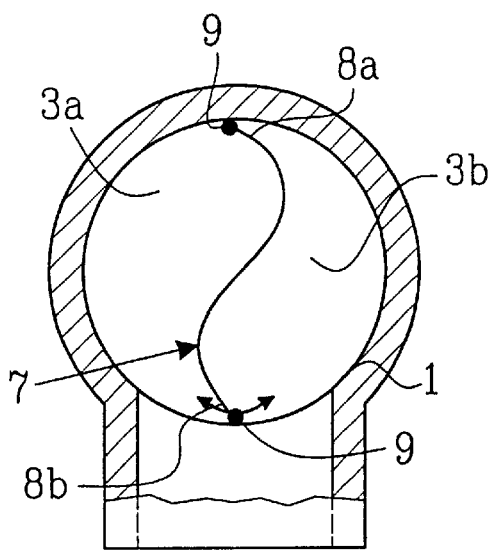
FIGS. 2a–2c shows horizontally sections through a refuse chute according to FIG. 1 with the chute separator in different positions.
Figure 2B:
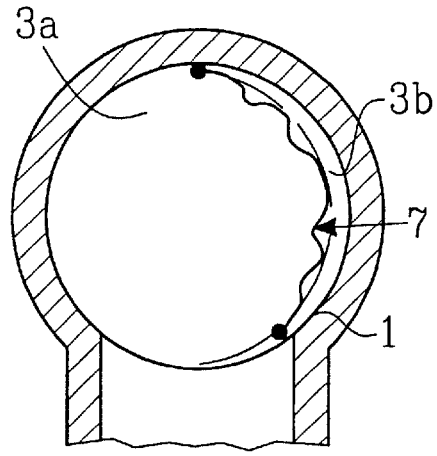
Figure 2C:
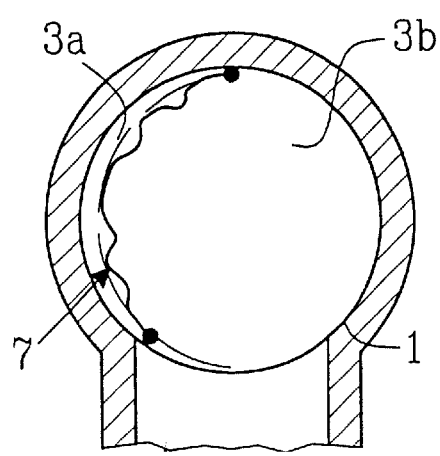

In the refuse chute a pliable separator 7 essentially extending along the whole chute is arranged, which divides the chute 1 diagonally into two subchannels 3a and 3b. The width of the separator 7 is larger than the inner diameter of the refuse chute, preferably corresponding to half of the circumference of the chute and is mounted at the side edges 8a and 8b along the chute so that one side edge 8b is aligned with the refuse-chute inlet opening 2. By placing one side edge of the separator 7 just in front of the opening 2, this part of the side edge can easily be brought aside by a channel selector 6, as to make one subchannel 3a or the other 3b available. In FIG. 2a the side edge 8b of the separator takes a middle position while the side edge 8b has been moved to the right side in FIG. 2b and in FIG. 2c to the left side, to be able to fully utilize the cross section of the opening 2.

Figure 2D:
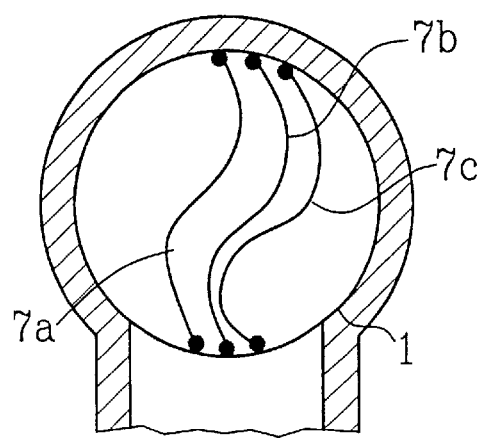
FIG. 2d shows a corresponding horizontal section through the refuse chute with a modified chute separator.

If sorting of several fractions through the same input opening is desired, several, e.g., three separators 7a–7c can be used, as shown in FIG. 2d.

In FIG. 1a the separator is shown in a normal position, i.e. the position it automatically returns to, after it has been adjusted. In this position a thrown refuse sack A will pass directly through the chute 1 to a container 5a, whereas in FIG. 1b the channel selector 6 is shown in its opposite position, such as the separator 7 guides the refuse sack B through the chute to container 5b. The shaft separator 7 is suitably arranged in its lower part by means of a spring 27 arranged in the upper part of the separator.

The separator 7 suitably consists of a film or cloth-like, air permeable material, preferably of synthetic fibres or similar. For sanitary and/or risk of fermentation reasons, textile or cellulose fibres should not be used, since the practical operation life for such material will be too short. If the shaft separator 7 is produced from a woven structure, it is preferably made of a thread interlacing such that smooth surfaces is obtained on each side, to get it soil repellant. Suitable materials are polyethylene, polypropylene or similar.

The shaft separator 7 is reinforced along the side edges 8a and 8b, suitably by means of longitudinally threads, in which a carrying device 9, e.g., a thread, wire, rod or the like, is threaded or woven.

Figure 3:
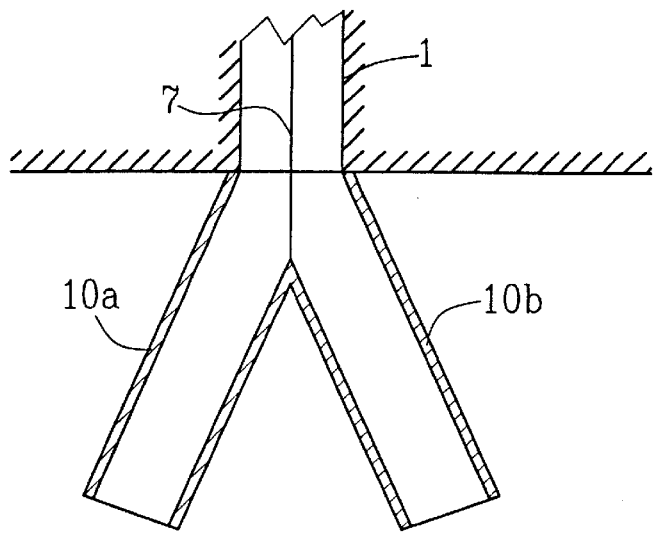
FIG. 3 shows a variant of the lower part of a refuse chute with an associated refuse chamber.

In FIG. 3 is the shaft separator 7 in the refuse chamber 4 attached to the branch between two tubes 10a and 10b, which guides the present waste to the right container in the refuse chamber. The waste coming down the tube 10a ends up in container 5a and the waste coming down in tube 10b ends up in container 5b. The number of tubes 10a and 10b can be increased depending on how many fractions are to be sorted.

The shaft separator 7 may also continue down to the refuse chamber 4 and terminate with an waste sorter (not shown), which guides the waste to the right container. This solution is above all intended for small refuse chambers, where there is only room for one container at a time below the lower opening of the shaft.

The mounting of the shaft separator

Figure 4A:
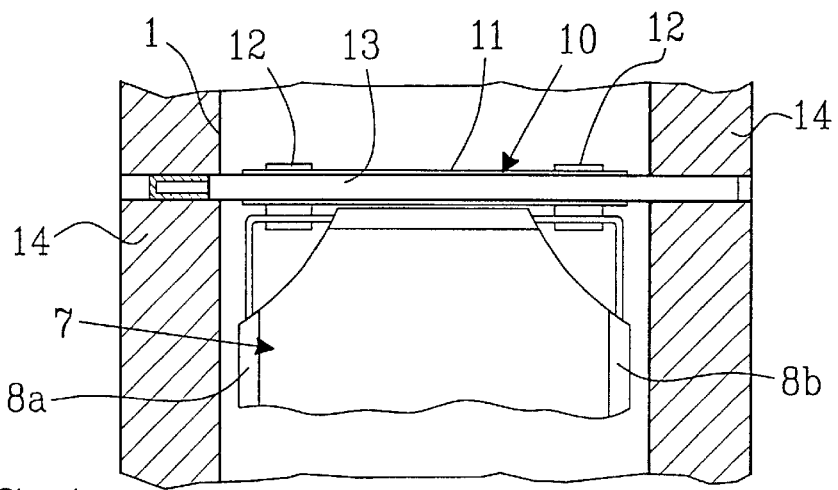
FIGS. 4a–4f show different hanging devices for refuse separators according to the invention.

FIGS. 4a to 4f show different devices for hanging and the attaching the shaft separator in the refuse chute 1. The shaft separator 7 is preferably reinforced along the side edges 8a and 8b, e.g., by means of a wire 9 or the like, which in FIG. 4a is attached by wire clamps 12 to a hanging device 10 in the shape of a tube 11. The hanging device 10 is wired up in the shaft and is locked in the desired position by a locking rod 13, which is inserted through drilled holes in the shaft wall 14. A locking device (not shown) holds the locking rod in its place, so it can not be displaced after the mounting has been completed.

Figure 4B:
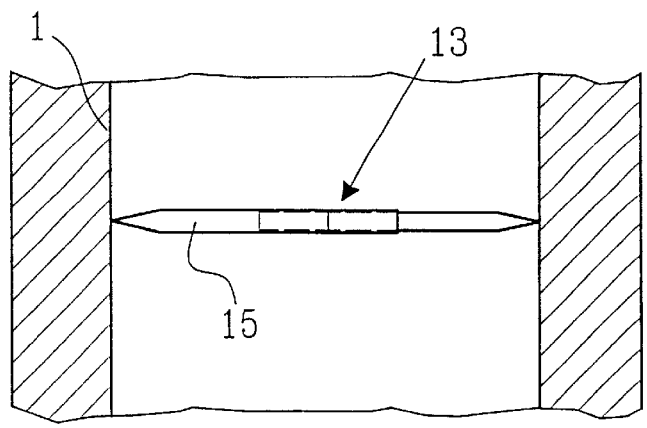

FIGS. 4b–4e show other alternatives of the locking rod 13 for those cases where the shaft can not be reached from the outside. In FIG. 4b the locking rod 13 consists of a telescopic expander 15, which is kept in place by stretching to the shaft walls. The expander 15 is hereby provided with sharp ends which are pressed a couple of millimeters into each side of the shaft and are thereby fixedly attached.

Figure 4C:
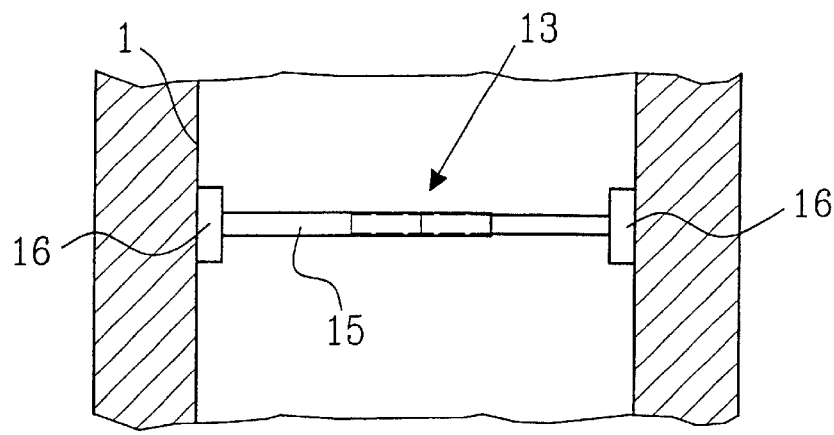

The locking rod according to FIG. 4c has the same function as the one in FIG. 4b, i.e., also here is arranged an expander, which by means of friction surfaces 16 is kept attached to the shall walls.

Figure 4D:
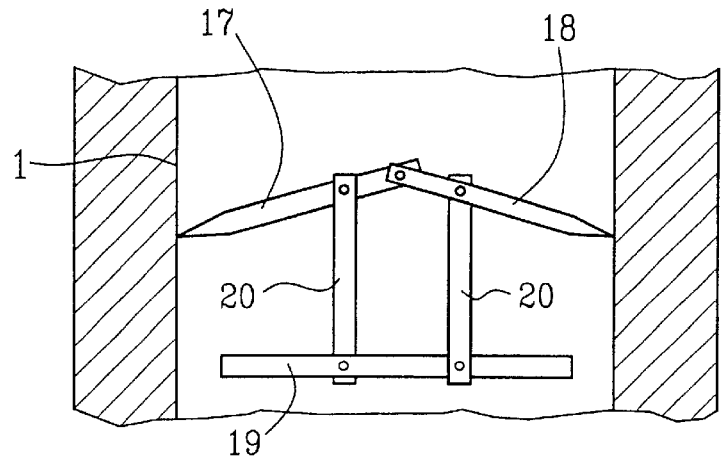

FIG. 4d shows a cutter construction having two rotatably mounted cutting peaks 17, 18 about each others ends, to which a hanger 19 is movable arranged via slewing brackets 20. The construction results in, that the more the hanger 19 is pulled, the harder the peaks 17, 18 are pressed into the shaft 1.

Figure 4E:
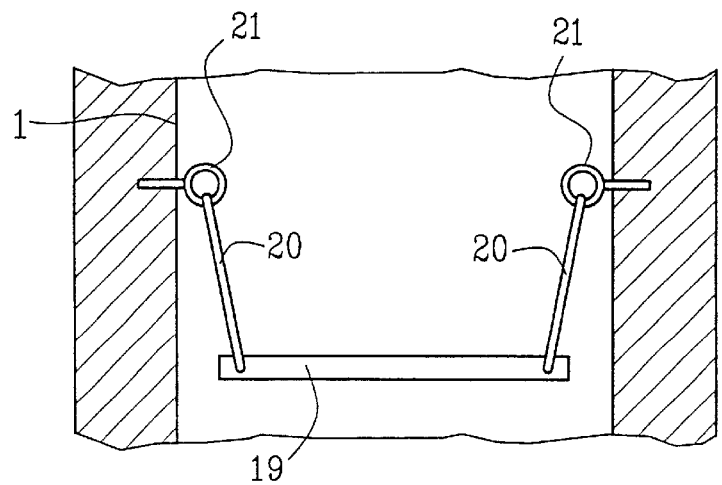

In FIG. 4e two loops 21 is mounted in the shaft 1 for each link 20, which carries a hanger 19.

Figure 4F:
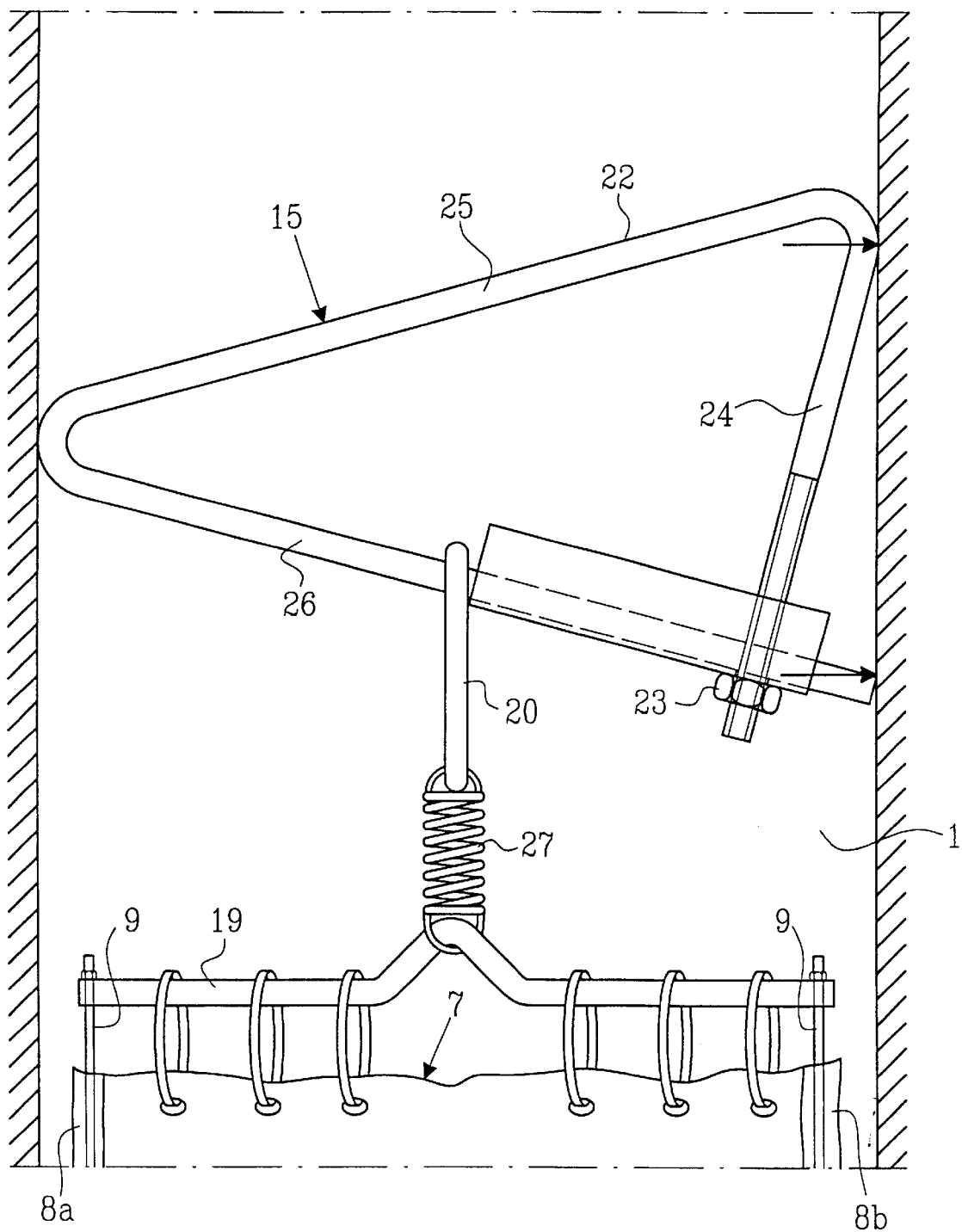

In the embodiment according to FIG. 4f the expander 15 is formed from a triangular spring strap one shank 24 of which is provided an external thread. By applying a nut 23 the two other shanks can be pressed together, whereby the distance decreases between them and a pressure against the shaft wall arises. By one of the shanks a link 20 is applied, which via a spring carries a hanger 19, to which the upper part of the shaft separator 7 is attached.

The channel selector

FIG. 5 shows in a front view an inlet 2 with the door 32 open, whereas FIG. 6 shows the same view with the door 32 closed and FIG. 7 a horizontal section through the shaft 1 also with the door closed. In this embodiment the shaft separator extends from the inlet opening 33 over to the other side of the shaft 1, and with one side edge 8b and associated carrier device 9 aligned against said opening 33. A channels selector 6 is connected to the side edge 8b of the shaft separator inside the inlet opening, by means of which the shaft separator can either be pushed to the right or to the left, in order to easier get the waste into subchannel 3a or 3b, respectively.

FIG. 8 shows an embodiment, wherein a somewhat smaller door 34 is arranged inside a bigger door 35 and where the hinges of the doors 36, 37 are arranged on opposite sides. A slewing bracket 38 or the like is attached partly to one side edge 8b of the shaft separator 7 and partly at the centre of the smaller door 34. By opening the smaller door 34, the slewing bracket 38 moves the front edge of the shaft separator to one side, the left, and by opening the big door 35, it is being moved to the other side, the right, as can be seen in FIGS. 9 and 10, wherein the subchannel 3b and 3a respectively gets accessible.

FIGS. 11–13 show an embodiment, wherein an operating bar 39 in the form of a crank-like rod 14 is arranged rotatably around a suspension point 41 at the upper edge of the inlet opening 32. The inner end of the bar 39 is connected to the shaft separator. The operating bar 39 is used for operating the shaft separator 7 to a the desired position, right or left.

FIGS. 14 and 15 show an embodiment, wherein the shaft separator 7 is arranged to be operated by a control means 42 at the side of the refuse chute. The control means 42 can be an electrical actuator, which is incorporated in an electrical circuit 32 common for all doors and which can be equipped with an manually operating bar 43, which via a slewing bracket system 44 is connected to the shaft separator. By means of a retracting spring (not shown) the shaft separator is brought back to the starting position. By usage of a slewing bracket system with stiff arms, the stiffness in the system is being used to bring the shaft separator to either side. An electrical circuit common for all refuse chutes is arranged for those cases, where a temporary locking of the doors is desired, when a door in the system is opened.

FIG. 16 shows an embodiment, wherein the shaft separator 7 includes two planar plates 7a and 7b, connected to each other via a hinge. In the same way as in the other embodiments, the separator is connected at its front edge to a channel selector 6, by means of which the separator can be brought aside.

The invention is not limited to the shown and described embodiments, several variants are applicable within the scoop of the claims.

What is claimed is:

1. A device at refuse chute comprising:
   a shaft, provided with one or more refuse chute inlets, which shaft ends in a refuse chamber,
   at least two subchannels arranged for the transfer of the waste in the shaft, which are arranged to end in said refuse chamber, whereby the subchannels are formed partly from at least one shaft separator or a pliable material, which extends along a substantial part of the shaft, wherein the subchannels are formed partly of parts of the shaft wall, the shaft separator is arranged to substantially diametrically divide the shaft longitudinally, whereby the shaft separator, which suitably is provided with reinforced longitudinally extended side edges mounted by a spring at the upper and lower part of the shaft, one of the side edges of the shaft separator is situated just in front of the refuse chute inlet(s), and said side edge is laterally displaceably arranged by a channel selector in or close to the refuse chute inlet.

2. A device according to claim 1, wherein the width of the shaft separator substantially corresponds to half of the inner circumference of the shaft.

3. A device according to claim 1, wherein the channel selector for the lateral movement of the shaft separator consists of a crank attached to the selector, which is operable from the inlet opening by means of an actuating lever.

4. A device according to claim 1, wherein the channel selector is connected to the front side edge of the shaft separator and consists of a slewing bracket system arranged at the inlet opening.

5. A device according to claim 1, wherein the channel selector consists of a wire or stewing bracket arranged between the front side edge of the shaft separator and a closable door at the inlet opening, which is hinged on two opposite situated sides and that a closing device for alternative opening of the door is arranged around both of the hinges.

6. A device according to claim 1, wherein the channel selector consists of a wire or slewing bracket arranged between the front side edge of the shaft separator and an inner door, which is surrounded by and hingedly connected to an outer door, which both doors are hinged on two opposite sides and that each door is provided with its own closing device.

7. A device according to claim 1, wherein the shaft separator consists of an air permeable plastic film or cloth having dirt repellant surfaces, such as polyethylene, polypropylene, and that the cloth is made of a binding which gives a smooth surface.

8. A device according to claim 1, wherein the shaft separator is arranged to extend a distance below the shaft outlet, and that the lower part of the shaft separator is formed or formable to a chute and/or for connection to a conduit or tube bend.

9. A device according to claim 1, wherein the upper attachment of the shaft separator which is attachable to the shaft, comprises an expander, which is attachable to the inner shaft walls, and that by the expander via a pulling spring a hanger, yoke or similar is provided to carry the shaft separator.

10. A device according to claim 9, wherein the expander comprises a V-shaped spring strap, the shanks of which can be pressed together, whereby the distance between these decreases and a pressure against the wall of the shaft arises.

* * * * *